United States Patent [19]

Steiner et al.

[11] Patent Number: 4,786,114

[45] Date of Patent: Nov. 22, 1988

[54] STABILIZING MECHANISM FOR A FOLLOWER GUIDE AXLE OF A VEHICLE TRAILER

[75] Inventors: Helmut Steiner; Karl-Erich Holländer, both of Wiehl, Fed. Rep. of Germany

[73] Assignee: Bergische Achsenfabrik Fr. Kotz & Söhne, Wiehl, Fed. Rep. of Germany

[21] Appl. No.: 52,778

[22] Filed: May 21, 1987

[30] Foreign Application Priority Data

May 21, 1986 [DE] Fed. Rep. of Germany ....... 3616998

[51] Int. Cl.$^4$ .................... B60B 35/00; B60B 25/00
[52] U.S. Cl. .................... 301/124 R; 280/96.1; 280/673; 267/150
[58] Field of Search .............. 267/150; 280/96.1, 673, 280/675, 661; 301/124 R, 125

[56] References Cited

U.S. PATENT DOCUMENTS

| | | | |
|---|---|---|---|
| 1,271,537 | 7/1918 | Bright | 267/150 |
| 1,865,202 | 6/1932 | Milligan | 280/96.1 |
| 1,966,795 | 7/1934 | Garrison | 280/96.1 |
| 2,851,280 | 9/1958 | Matteazzi | . |
| 2,923,555 | 2/1960 | Kost et al. | 280/96.1 |
| 3,294,413 | 12/1966 | Jurosek et al. | 280/96.1 |
| 4,595,216 | 6/1986 | Ware | 280/673 |
| 4,635,952 | 1/1987 | Smith | 280/96.1 |
| 4,690,418 | 1/1987 | Smith | 280/96.1 |

FOREIGN PATENT DOCUMENTS

| | | | |
|---|---|---|---|
| 201965 | 11/1986 | European Pat. Off. | 280/96.1 |
| 1965073 | 7/1967 | Fed. Rep. of Germany | . |
| 2332387 | 1/1975 | Fed. Rep. of Germany | . |
| 953736 | 12/1949 | France | . |

Primary Examiner—William L. Freeh
Attorney, Agent, or Firm—Becker & Becker

[57] ABSTRACT

A stabilizing mechanism for a follower guide axle of a vehicle trailer. The wheels of the axle are mounted on the axle body of the latter via respective knuckle arms, and the wheels are interconnected via respective guide levers and a tie bar. To improve the stabilizing mechanism, respective pressure mountings are disposed between each of the knuckle arms and the axle body, with the pressure mountings having cooperating sliding surfaces that have a wavelike configuration. Each of the pressure mountings includes an upper pressure disk that is attached to the axle body, and a lower pressure disk that is attached to the knuckle arm. Springs are provided for stabilizing the pressure mountings in a starting position that is associated with straight-ahead travel.

5 Claims, 3 Drawing Sheets

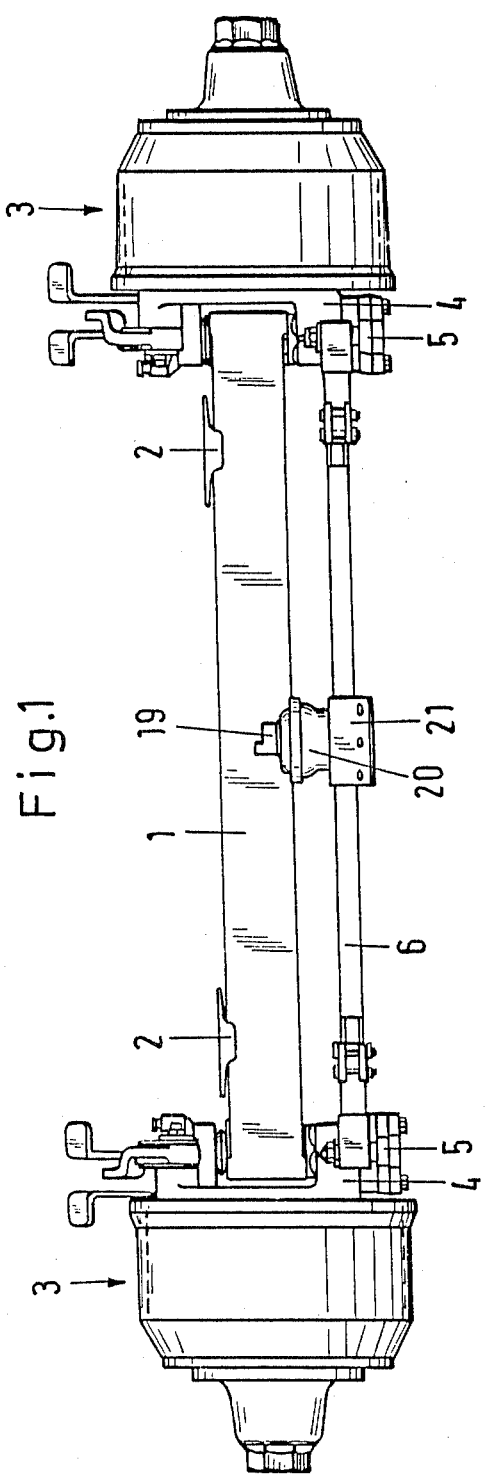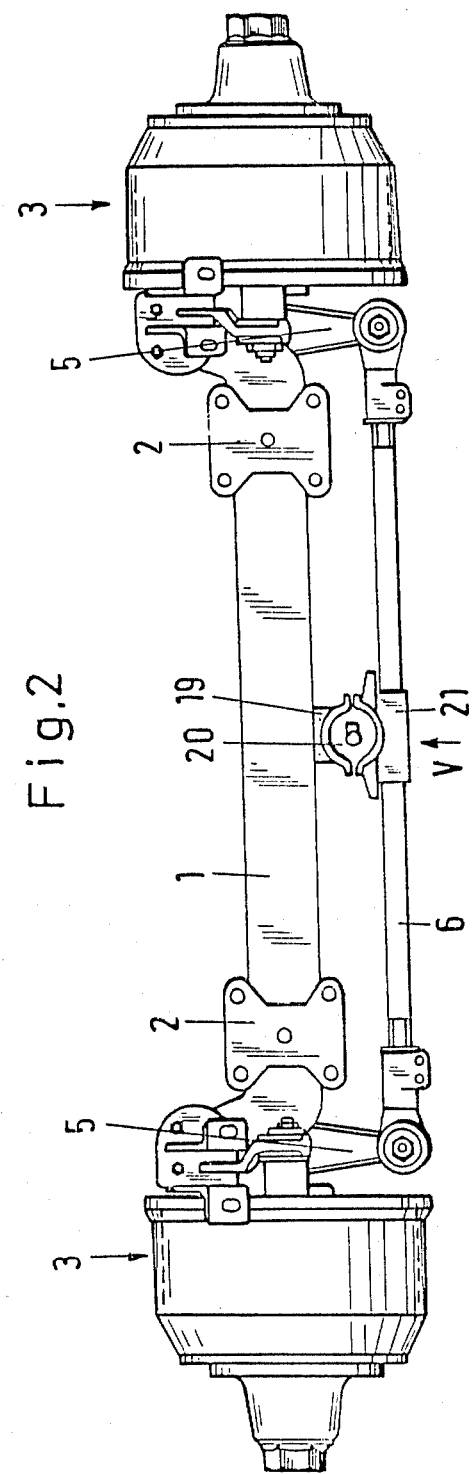

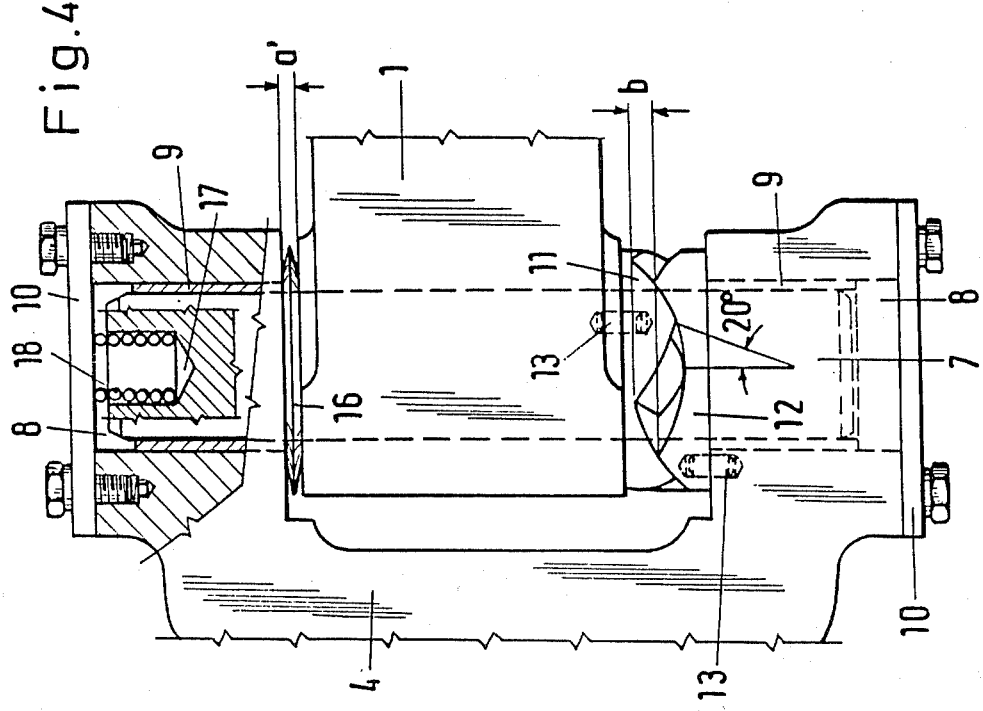
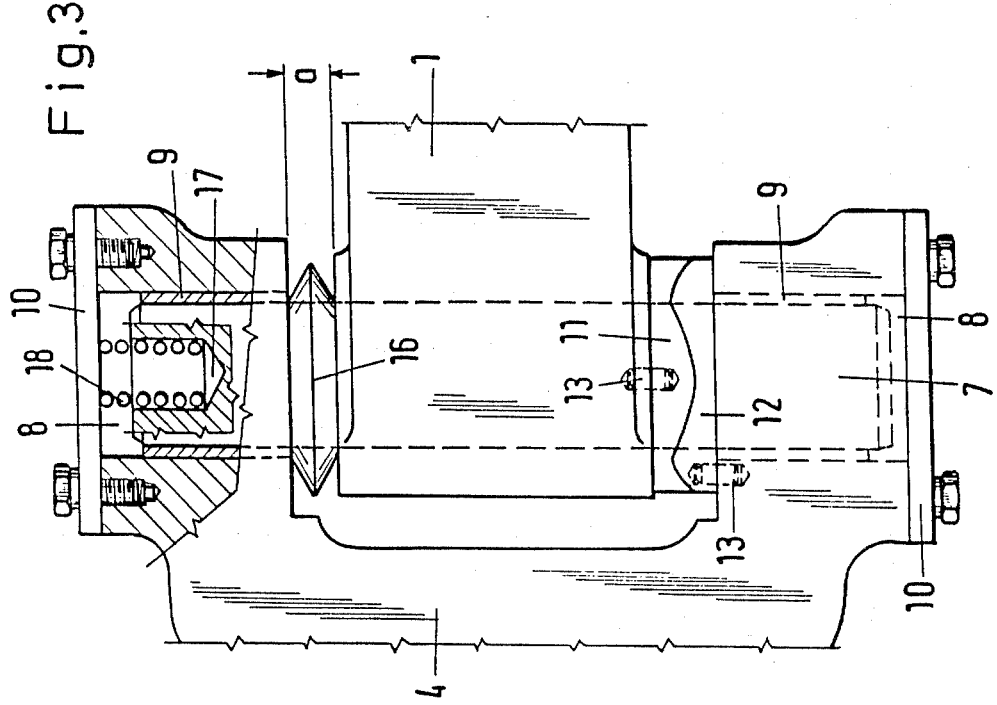

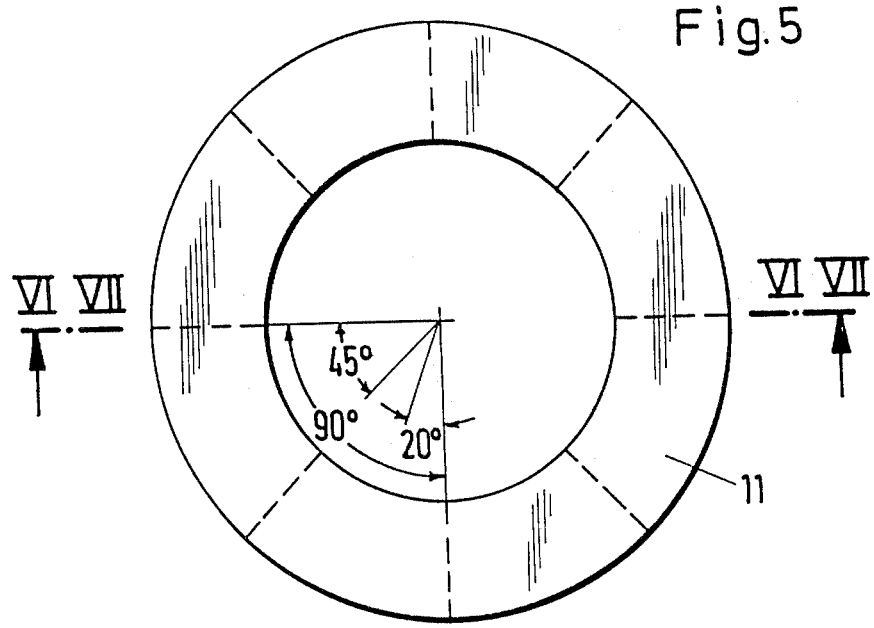

STABILIZING MECHANISM FOR A FOLLOWER GUIDE AXLE OF A VEHICLE TRAILER

BACKGROUND OF THE INVENTION

The present invention relates to a stabilizing mechanism for a follower steering or guide axle of a vehicle trailer. The wheels of the axle are mounted on the axle body of the latter via respective knuckle arms, with the wheels being interconnected via respective guide levers and a tie bar.

Various embodiments of guide axles of the aforementioned general type for vehicle trailers are known. With these guide axles, a stabilizing mechanism is provided between the axle body and the tie bar. Such a stabilizing mechanism comprises, for example, inclined shock absorbers that on the one hand are connected to the tie rod and on the other hand are connected to the axle body. Since the shock absorbers were able to cope for only a short period of time with the loads that occur during driving operation, and since the stabilization during straight-ahead travel was imperfect, stabilizing mechanisms were developed that during straight-ahead travel fix the tie rod to the axle body in a specific position, and permit a maximum angle of turn only when a specific magnitude of the frictional forces between the tires and the roadway force such a turn. A follower guide axle having this improved stabilization is known, for example, from German Pat. No. 18 10 261 Steiner et al dated Mar. 19, 1970. With this known follower guide axle, a linkage that is displaceable in the longitudinal direction is disposed between the axle body and a segmented tie rod. This linkage is provided with a curve guidance that has a groove into which a guide roller constantly extends under elastic preload. In addition, a drag lever is mounted on the axle body. The inner ends of the tie rods are also connected to this lever, with the guide rollers that cooperate with the curve guidance being mounted on the tie rods. Although follower guide axles having such an improved stabilizing mechanism operate satisfactorily, they have a construction that requires a lot of maintenance and has a lot of parts that are subject to wear; in addition, such an arrangement requires a compressed air mechanism for operating the stabilizing mechanism.

It is an object of the present invention to provide a follower guide axle that has a straightforward construction and also has an improved stabilizing mechanism.

BRIEF DESCRIPTION OF THE DRAWINGS

This object, and other objects and advantages of the present invention, will appear more clearly from the following specification in conjunction with the accompanying schematic drawings, in which:

FIG. 1 is a view, from the rear, of one preferred exemplary embodiment of a follower guide axle and stabilizing mechanism;

FIG. 2 is a plan view of the arrangement of FIG. 1;

FIG. 3 is a view that shows the mounting of a knuckle arm on the axle body, with the stabilizing mechanism being in the starting position for straight-ahead travel;

FIG. 4 is a view that shows the same mounting of a knuckle arm on the axle body, but with the stabilizing mechanism being in a maximum angle of turn of approximately 20°;

FIG. 5 is a plan view of one exemplary embodiment of the inventive stabilizing mechanism;

FIG. 6 is a cross-sectional view of the upper pressure disk of the stabilizing mechanism taken along the line VI—VI in FIG. 5; and FIG. 7 is a cross-sectional view of the lower pressure disk of the stabilizing mechanism taken along the line VII—VII in FIG. 5.

SUMMARY OF THE INVENTION

The follower guide axle of the present invention is characterized primarily by a stabilizing mechanism that comprises respective pressure mountings that are disposed between each knuckle arm and the axle body and having cooperating sliding surfaces which have a wavelike configuration; in addition, spring means are provided for stabilizing the pressure mountings in a starting position that is associated with straight-ahead travel.

Pursuant to one preferred specific embodiment of the present invention, each pressure mounting can comprise a lower pressure disk that is connected to the knuckle arm, and an upper pressure disk that is connected to the axle body. The sliding surfaces of the pressure disks have at least one pair of intermeshing eaves, i.e. wave crests and wave troughs. In a preferred embodiment, the sliding surfaces have four such intermeshing waves.

The stabilizing mechanism is embodied as respective pressure mountings, each of which is disposed coaxial to a link pin that is shrunk-fit or otherwise secured in the axial body, with each knuckle arm being mounted on one such link pin. If, when driving in a curve, a specific magnitude of the frictional forces between the tires and the roadway force a maximum angle of turn, the pressure disk attached to the axle body rises along the pressure disk that is attached to the knuckle arm, thereby taking the axle body along with it. The upward movement of the axle body counteracts the axle load, so that a load-dependent return of the stabilizing mechanism into the starting position for straight-ahead travel results. In this way, the maximum angle of turn can be limited by the magnitude of the opening in the knuckle arm into which the axle body extends and in which, below the axle body, the stabilizing mechanism is disposed.

In order to prevent a steering lock or maximum angle of turn during straight-ahead travel, especially when travelling empty, a spring is expediently disposed between each knuckle arm and each link pin. This spring holds the stabilizing mechanism firmly in place, under elastic preload, in its starting position for straight-ahead travel.

The maximum movement stroke of the axle body within each knuckle arm should expediently be less than the depth of the wave troughs of the pressure disks.

A follower guide axle that is provided with the inventive stabilizing mechanism has the advantage of having an amazingly straightforward and extremely effective construction. The pressure mountings, with their intermeshing, wavelike sliding surfaces, are stabilized in their starting position for straight-ahead travel as a function of load, and require no additional pneumatic, hydraulic, or mechanical resetting mechanisms. The structural parts that constitute the stabilizing mechanism are easy to manufacture and require extremely little maintenance. As a result of the load-dependent resetting, a minimizing of the structural parts is coupled with an optimizing of the effectiveness.

Further specific features of the present invention will be described in detail subsequently.

DESCRIPTION OF PREFERRED EMBODIMENTS

Referring now to the drawings in detail, the follower steering or guide axle illustrated in FIGS. 1 and 2 is primarily provided as the rear and last axle in triple-axle assemblies when the interaxial distances are greater than 1 m in order, when driving in curves, to reduce the rubbing of the tires of the rear wheels and to bring about a better tracking of the overall triple-axle assembly.

The illustrated follower guide axle comprises an axle beam or body 1 having ends that are angled toward the front in the direction of forward travel V. The axle body 1 also has spring brackets 2 and wheels 3 that are connected to the axle body 1 via guide or knuckle arms 4 and are interconnected via a tie bar 6 and guide levers 5 that are connected to the knuckle arms 4.

The pivot of the mounting of a knuckle arm 4 on the axle body 1 is defined by a link pin 7 that is secured in the axial body 1, preferably by being shrunk-fit therein, and that is disposed at least 150 mm ahead of the center of the axle body 1 in the direction of forward travel V. The automatic tracking effect results from this staggered arrangement between the pivots of the two link pins 7 and the support points of the tires of the wheels 3, in other words the center of the axle body 1.

Each knuckle arm 4 extends, in a forked manner, about one end of the axle body 1 and is provided with holes 8 into which can extend those ends of the link pins 7 that project out of the axle body 1. The holes 8 are lined with support bushings 9 for the link pins 7, and are closed-off with covers 10.

Disposed between the axle body 1 and each knuckle arm 4 is a stabilizing mechanism that comprises an upper pressure disk 11 and a lower pressure disk 12. The upper pressure disk 11 is secured to the axle body 1, and the lower pressure disk 12 is secured to the knuckle arm 4. This attachment can be effected by set pins 13, but it is also possible to weld on the two pressure disks 11, 12. The sliding surfaces, of the two pressure disks 11, 12, that contact one another have a weightlike configuration. In the illustrated embodiment, each of these sliding surfaces has four wave crests 14 and four wave troughs 15 which intermesh, staggered relative to one another by an angle of 45°. This starting position when driving straight-ahead in the direction of forward travel V is illustrated in FIG. 3. When the frictional forces between the tires and the roadway exceed a given limit and bring about a maximum angle of turn, the sides of the wave crests 14 of the upper pressure disk 11 rise along the sides of the wave crests 14 of the lower pressure disk 12 until the clearance of motion of the axle body 1 in the forked opening of the knuckle arm 4 is used up. This end position, at a maximum angle of turn of approximately 20°, is illustrated in FIG. 4.

The two positions illustrated in FIGS. 3 and 4 during straight-ahead travel and travel in a curve show that the maximum stroke "a" that exists in the starting position of FIG. 3 shrinks to the residual stroke "a'" that remains during travel in a curve as shown in FIG. 4. The stroke differential "b" is a function of the slope of the wave crests 14 and of the angle of rotation of the two pressures disks 11, 12. The residual stroke "a'" can be set with a spring 16 that is disposed on the link pin 7 between the axle body 1 and the knuckle arm 4; this spring 16 could also be used as a seal.

So that, when the axle load is low, i.e. especially when travelling empty, the stabilizing mechanism is held firmly in place in its starting position under preload, a compression spring 18 is disposed in a blind hole 17 of the link pin 7; the compression spring 18 is also supported against the cover 10 of the knuckle arm 4.

The stabilizing mechanism must be arrested for the maneuvering when driving backwards. The arresting mechanism can comprise a fixation between the axle body 1 and the tie bar 6, or can also be realized by a blocking of the stroke "a" between the axle body 1 and the knuckle arm 4. In the embodiment illustrated in FIGS. 1 and 2, there is secured to the axle body 1 an interlock 19 that has a locking cylinder 20 which cooperates with an interlock 21 attached to the tie bar 6.

The present invention is, of course, in no way restricted to the specific disclosure of the specification and drawings, but also encompasses any modifications within the scope of the appended claims.

What we claim is:

1. A stabilizing mechanism for a follower guide axle of a vehicle trailer, with the wheels of said axle being mounted on the axle body of the latter via respective knuckle arms, and with said wheels being interconnected via respective guide levers and a tie bar; said stabilizing mechanism comprises:
   respective pressure mountings that are disposed between each of said knuckle arms and said axle body, and that have cooperating sliding surfaces which have a wavelike configuration; and
   spring means for stabilizing said pressure mountings in a starting position that is associated with straight-ahead travel, each of said pressure mountings comprising an upper pressure disk that is attached to said axle body, and a lower pressure disk that is attached to said knuckle arm, said sliding surfaces of said pressure disks of a given pressure mounting being provided with at least one pair of intermeshing wave crests and wave troughs, said axle body having a maximum movement stroke within each knuckle arm, with said maximum stroke being less than the depth of said wave troughs of said pressure disks.

2. A stabilizing mechanism according to claim 1, in which said sliding surfaces of said pressure disks of a given pressure mounting are provided with four intermeshing wave crests and wave troughs.

3. A stabilizing mechanism according to claim 1, which includes link pins secured in said axle body, with each of said knuckle arms being mounted on one of said link pins.

4. A stabilizing mechanism according to claim 3, in which said spring means comprises respective springs disposed between each knuckle arm and each link pin.

5. A stabilizing mechanism according to claim 4, in which each of said springs is disposed about one of said springs between said knuckle arm and said axle body

* * * * *